Oct. 13, 1959     M. WATTER ET AL     2,908,802
ROLLER WELDING APPARATUS
Filed March 4, 1958     9 Sheets-Sheet 1

INVENTORS
Michael Watter
Walter S. Eggert, Jr.
BY Wm. R. Ghisson
ATTORNEY

Oct. 13, 1959 M. WATTER ET AL 2,908,802
ROLLER WELDING APPARATUS
Filed March 4, 1958 9 Sheets-Sheet 3

FIG.9

INVENTORS
Michael Watter
Walter S. Eggert, Jr.
BY
Wm. R. Glissom
ATTORNEY

FIG. 11

Oct. 13, 1959  M. WATTER ET AL  2,908,802
ROLLER WELDING APPARATUS

Filed March 4, 1958  9 Sheets-Sheet 7

INVENTORS
Michael Watter
Walter S. Eggert, Jr.

BY
Wm. R. Glisson
ATTORNEY

Oct. 13, 1959

M. WATTER ET AL 2,908,802

ROLLER WELDING APPARATUS

Filed March 4, 1958

INVENTORS
Michael Watter
Walter S. Eggert, Jr.

BY
Wm. R. Glisson
ATTORNEY

United States Patent Office 2,908,802
Patented Oct. 13, 1959

2,908,802

ROLLER WELDING APPARATUS

Michael Watter and Walter S. Eggert, Jr., Philadelphia, Pa., assignors to The Budd Company, Philadelphia, Pa., a corporation of Pennsylvania Application March 4, 1958, Serial No. 719,134

12 Claims. (Cl. 219—81)

This invention relates to resistance welding apparatus and has for an object the provision of improvements in this art.

One of the particular objects of the invention is to provide a welder of the work-traversing type comprising a pair of relatively movable electrodes, specifically disclosed herein as rolls having movement about axes distant from the rolls and having adjustment to cause them to face each other squarely for different heights and thicknesses of a workpiece.

Another object is to provide a welder in which the workpiece travels at a fixed elevation and in which the traversing electrodes adjust to face each other squarely on the workpiece when working at horizontal center lines at different levels and when working with different spacings between rolls.

Another object is to provide paired electrodes which are movable about distant axes and which are operated by a common power device so that the entire roll supports and power system are free to float in space to take up a position required by a workpiece moving between the rolls.

The above and other objects and advantages of the invention and various novel features will be apparent from the following description of certain exemplary embodiments, reference being made to the accompanying drawings, wherein.

*First form*

*Second form*

*Third form*

In all forms the welder comprises a table for a workpiece movable past a pair of coacting welding electrodes, here illustrated as rolls, which engage the workpiece through a longitudinal slit in the table. The table is moved by power means and the same power means positively drives a series of weld timing cams so arranged with switches that any cam and its associated switch can be selectively brought into action to make welds of selected spacing along the workpiece.

The rolls are mounted on swing axes distant from the weld line so as to be adjustable relative to the surface plane of the table whereby to weld along lines which are either near the table surface or at different distances above the table surface. The need for this will be apparent when it is noted that at times welds are made in two or more sheet thicknesses which lie flat on the table and on each other, that at other times welds are made in faying sheets which are supported, as by stringers or the like, at a distance above the table surface, and that at other times welds are made at more than one level, as when composite sandwich structures are made on interior supporting mandrels.

In every case there is a medial working plane between rolls and it is desirable to keep the rolls squarely opposed to each other with reference to this medial plane. Stated another way, the two radii of the two rolls which extend from the axes of rotation to the point of contact or tangency with the workpiece surface should lie in a common straight line joining the roll axes in a common plane of action on the workpiece. This common plane of action will usually include the medial planes of the rolls since the rolls are usually designed to engage the workpiece along their central trans-axial planes. The rolls are so mounted that they are adjustable relative to their intermediate welding or working plane (the plane between them which is parallel to the table surface plane or the weld line to be made) and, as stated, float freely relative to the table so as to apply pressure only relative to each other. The machines, though large and strong, are adapted to operate on even delicate sandwich structures which are too weak to withstand the heavy pressures necessary for making sound welds if not directly supported.

A common power device moves the rolls relative to each other and if one roll engages the workpiece slightly ahead of the other the reaction of it on the workpiece will bring the other roll into engagement. After engagement the rolls will freely follow the surfaces of the workpiece and if there are slight irregularities relative to the table surface this will not change the pressure of either roll on the workpiece. Neither will the expected slight irregularities materially change the proper opposing disposition of the rolls relative to each other.

First embodiment

In the first form or embodiment shown in Figs. 1 to 8, the rolls are mounted to swing about axes which are parallel to the weld line. In this case when the rolls are properly adjusted to the common inter-roll working plane their pressure radii will meet in the common working plane and if the roll axes are parallel, as shown, the working radii will lie in a common line between roll axes in the working pressure planes. If the roll positions are not properly adjusted the working or pressure radii will not meet in the common working pressure plane but will lie in two parallel planes and the rolls will then tend to twist the workpiece on the table and proper welding pressure will not be obtained. In all cases, however, the working radii of the rolls will lie in a common plane through the two roll axes.

Figure 1:
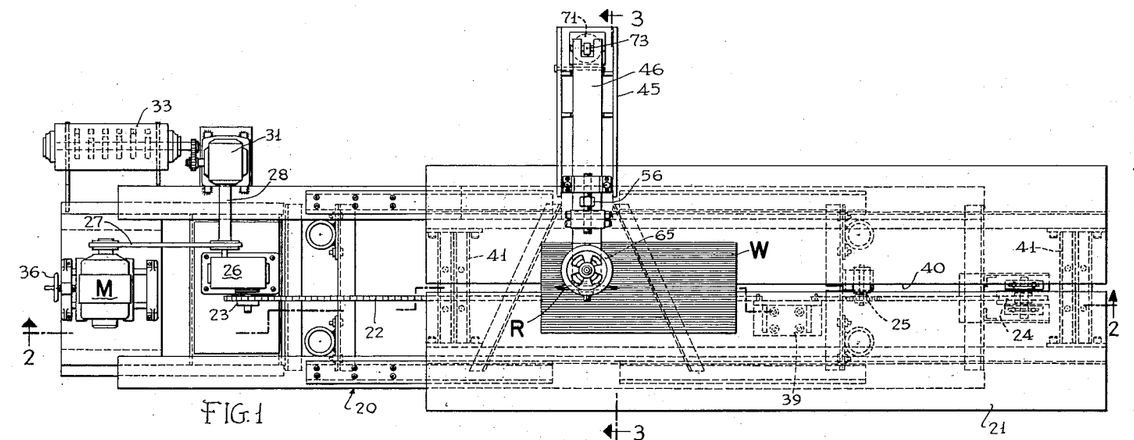
Fig. 1 is a top plan view of a table roller welder having rolls mounted for swinging movement about distant axes which are parallel to the weld line, that is, transverse to the roll axes in horizontal planes.
Figure 2:
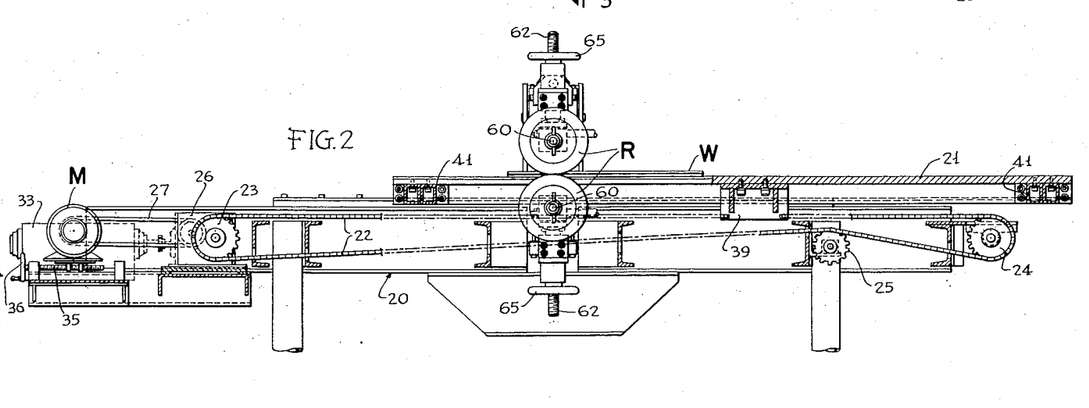
Fig. 2 is a longitudinal vertical section and elevation taken on the line 2—2 of Fig. 1.

The machine comprises a base frame 20 supporting a table 21 for easy reciprocatory movement produced by an endless belt or chain 22 carried by sprockets 23, 24, 25 and driven from a gear box 26. A motor M drives the gears of the gear box through a belt 27 and a shaft 28.

The shaft 28, through a gear box 31, drives the shaft 32 of a set of weld timing cams operating a plurality of weld timing switches housed in a cam box 33. By suitable selector mechanism mounted in a position convenient to the operator near the welding station any one of the cam operated switches may be thrown into action to the exclusion of the others. Such timing selector mechanism per se is known and need not be illustrated, it being only necessary to note that through the shaft 28 and the gear boxes 31 and 26 the table moving chain 22 and the timing shaft 32 are driven positively together in either direction of table movement.

The motor may be adjusted by an adjusting screw 35 and hand wheel 36 to tighten or loosen the belt 27.

Figures 3, 4, 5, 6, 7, 8:
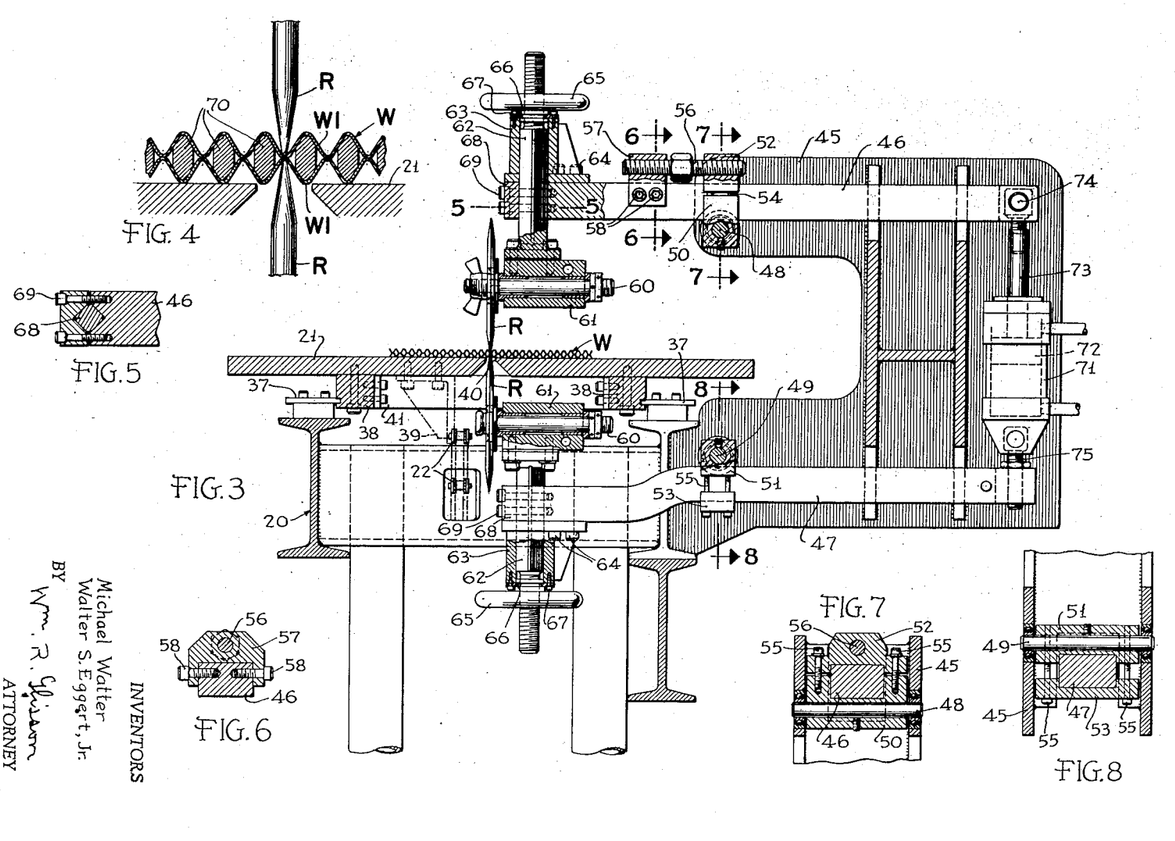
Fig. 3 is an enlarged transverse vertical section taken on the line 3—3 of Fig. 1.
Fig. 4 is a further enlarged partial section taken in the roll zone of Fig. 3.
Fig. 5 is a horizontal section of a detail taken on the line 5—5 of Fig. 3.
Fig. 6 is a vertical longitudinal section of a detail taken on the line 6—6 of Fig. 3.
Fig. 7 is a vertical longitudinal section of a detail taken on the line 7—7 of Fig. 3.
Fig. 8 is a vertical longitudinal section of a detail taken on the line 8—8 of Fig. 3.
Figure 9:
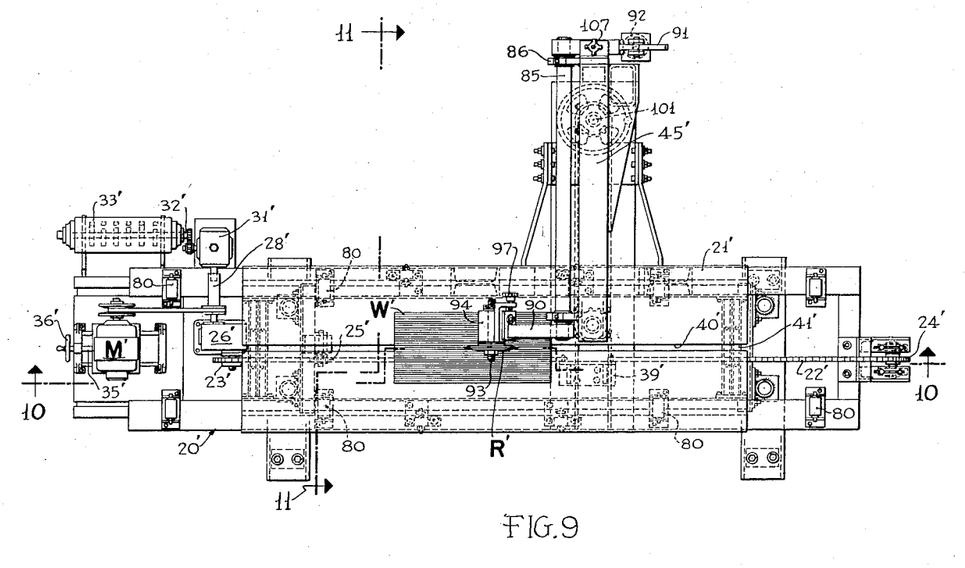
Fig. 9 is a top plan view of a table roller welder having rolls mounted for swinging movement about distant axes which are transverse to the weld line and horizontal, that is, parallel to the roll axes.

The table is retained on its supporting frame for sliding movement by any suitable means, for example, as shown in Fig. 3, by guide plates 37 fitting in grooves in rigidifying beams 38 secured beneath the table. A bracket 39 secured beneath the table intermediate its length has secured to it the drive chain 22 for moving the table. The table is made with a longitudinal slit 40 to accommodate the rolls and the table is connected at the ends by cross beams 41 secured beneath the table and to the side beams.

The welding apparatus includes a heavy rigid C-frame 45 secured to the side of the base frame in any suitable way. Specifically it is here shown (Fig. 3) to be welded but it could be adjustably mounted as illustrated for the second form or embodiment, later to be explained.

Swinging beams or levers 46 (upper) and 47 (lower) are adjustably mounted on pivot pins 48 and 49 on the C-frame 45. As shown in Figs. 7 and 8, members 50 and 51 which carry the pivot pins 48 and 49 respectively are clamped to the beams 46 and 47 respectively by clamp blocks 52 and 53 and cap bolts 54 and 55. The upper beam is controllably adjusted in position relative to its pivot pin by a reversely threaded screw 56 threaded in the clamp block 52 and in a block 57 secured to the beam (Fig. 6) as by cap bolts 58.

The welding rolls R are mounted on shafts 60 turnably mounted in bearings 61 carried on non-round guide bars 62 slidably mounted in head members 63 secured to the ends of the beams 46 and 47 as by cap bolts 64. The guide bars 62 are cylindrical and threaded at their outer ends and are adjusted by hand operated nuts 65 turnably and non-slidably retained by plates 66 secured to the members 63 by cap bolts 67. When adjusted, the guide bars 62 are locked in position by clamp blocks 68 secured (Fig. 5) by cap bolts 69.

It will be seen that by the adjustments provided the rolls can be moved apart or together to change the space between them or can be moved in the same direction to shift the elevation of the weld line or lines relative to the top plane of the table.

In Fig. 3 and in Fig. 4, in enlargement, there is shown a workpiece W having mating corrugated sheets W1 which are being welded together at their faying corrugation surfaces. This weld line is located at a distance above the table surface equal to half the thickness of the sandwich core being formed, that is, the pitch depth of the corrugations of one sheet. The rolls have been adjusted for this weld line elevation.

When the flat cover sheets are welded on there will be two weld lines at the other corrugations or nodes of the sheets which are separated by the mandrels 70. For this the lower roll will make one weld line at the surface of the table and the upper roll will make another weld line above the mandrel. The intermediate working plane will be located at the same place as before (except as raised by the thickness of the bottom flat cover sheet while it lies on the table under the sandwich assembly), namely at the faying plane of the inner corrugations, but the rolls will be adjusted to accommodate the thickness of the sandwich assembly between them.

In case two flat sheets are being welded together, or it may be a flat sheet is being welded to a corrugated sheet, the weld line and common intermediate working plane both lie near the upper surface plane of the table.

The roll levers are operated to move the rolls relative to each other by a comon power device, here shown as a reciprocatory fluid motor including a cylinder 71, piston 72, upper piston rod 73 pivoted to the lever 46 by a pivot pin 74 and a lower cylinder rod 75 adjustably connected to the lever 47.

The operation and adjustment of the first form will be apparent from the previous description wherein the operation by details is brought out. As each weld line is completed the workpiece is moved over and secured for making the next weld line. If desired, transverse moving and holding means can be provided.

Second embodiment

In the second embodiment, shown in Figs. 9 to 16, the table and related mechanism are the same essentially as in the first form and corresponding parts are designated by the same reference characters with a prime (') added. One difference in detail is that the table is mounted on rolls 80 (Fig. 11) and is held down between guide rolls 81 and 82 and is held laterally by side guide rolls 83.

The welding roll C-frame 45' is much deeper and heavier than before and the welding rolls R' are mounted on transverse shafts 85 instead of on longitudinal swing axes, as before. The shafts 85 are turnably mounted in bearings 86 secured to the C-frame 45', as by cap bolts 87.

The shafts 85 at the forward end carry roll supporting arms 90, as by a force fit and welding thereon, and at the rear end carry power arms 91, as by a force fit and welding thereon, the latter being operated by a common power device 92, such as a reciprocatory fluid motor connected between them.

Figures 10, 12, 13, 14:
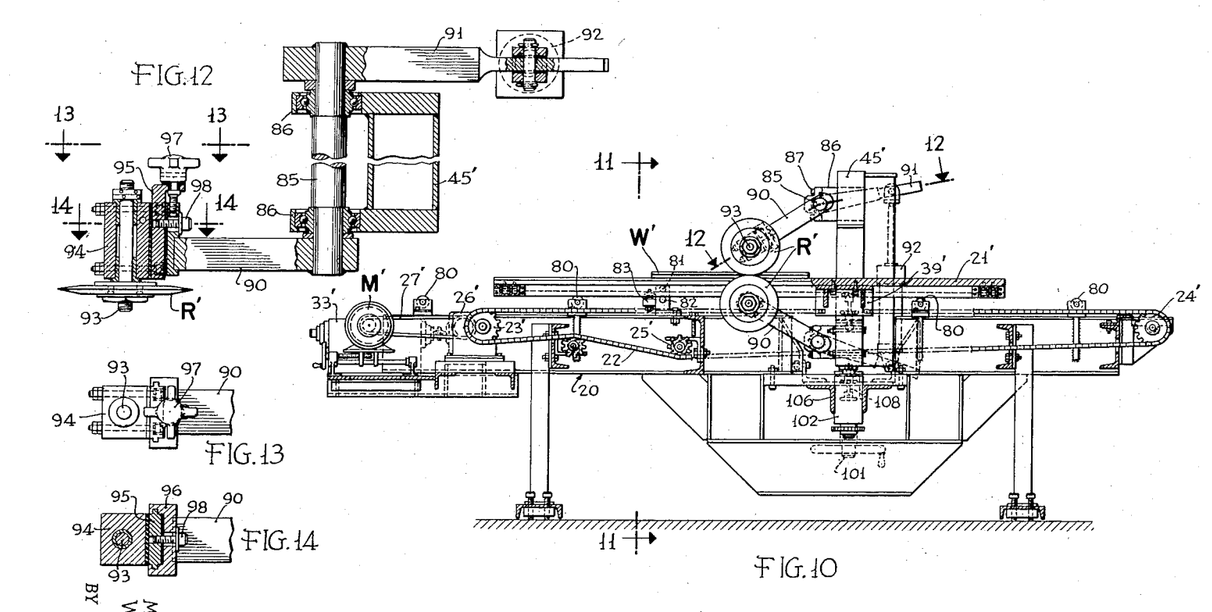
Fig. 10 is a longitudinal vertical section and elevation taken on the line 10—10 of Fig. 9.
Fig. 12 is an enlarged section of a detail taken on the line 12—12 of Fig. 10.
Fig. 13 is a partial longitudinal vertical section taken on the line 13—13 of Fig. 12.
Fig. 14 is a section of the detail shown in Fig. 13, the view being taken on the line 14—14 of Fig. 12.

The welding rolls are mounted on rotary shafts 93 carried by bearings 94 mounted on the ends of the arms 90. One of the roll shafts, the upper as shown in Figs. 12 to 14, is mounted for axial adjustment on the end of the arm, as by being carried by a slide 95 carried in guides 96 on the arm, and is moved by a hand screw 97 to various adjusted positions. Headed clamp bolts 98, threaded in the slide and operating in slots in the guide member, lock the parts together.

Figure 11:
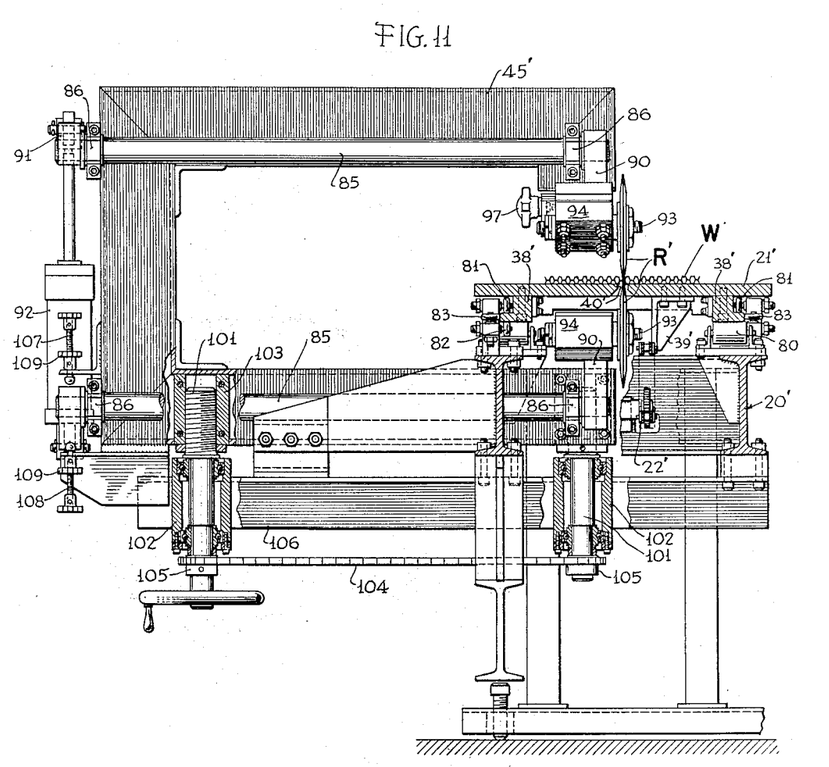
Fig. 11 is an enlarged transverse vertical section taken approximately on the line 11—11 of Figs. 9 and 10.
Figure 15:
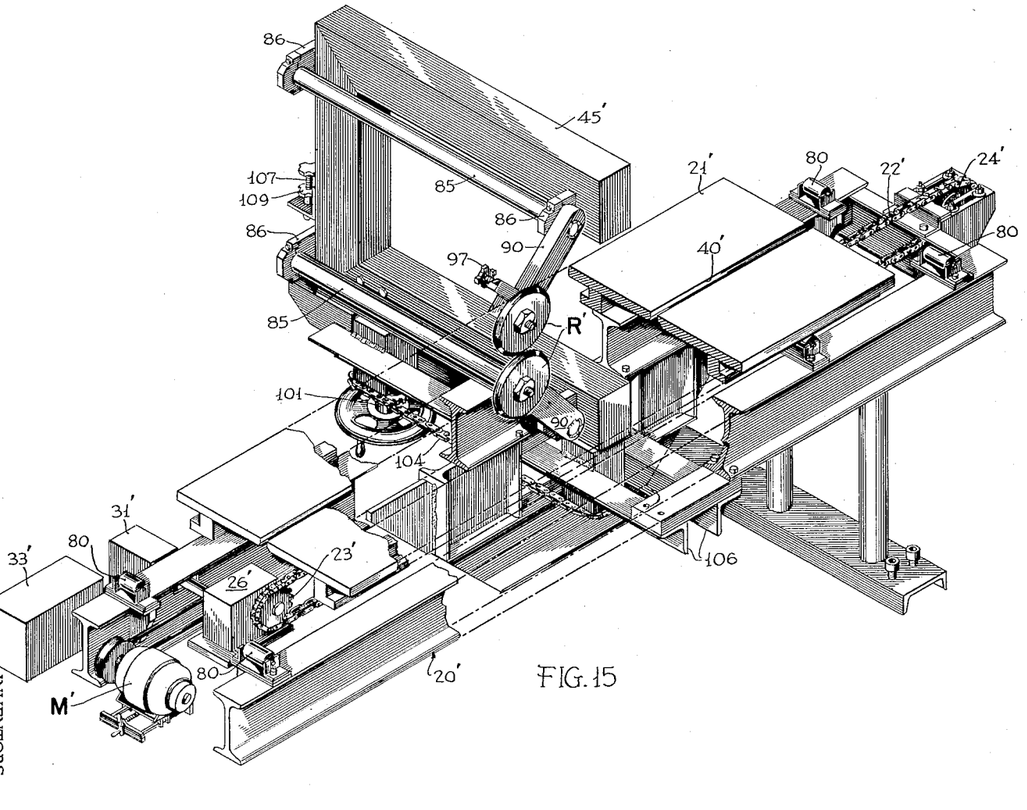
Fig. 15 is a perspective view from the open side of the machine with parts cut away.

The C-frame 45' is mounted for vertical adjustment relative to the table, the adjustment, Fig. 11, being provided by hand screws 101 mounted in thrust bearing retainers 102 and threaded in nut members 103 secured to the C-frame. The screws are geared together by a sprocket chain 104 mounted on sprockets 105 carried by the screw shanks.

The thrust bearing retainers 102 are rigidly secured between beams 106 extending outward from the table base frame.

Figure 16:
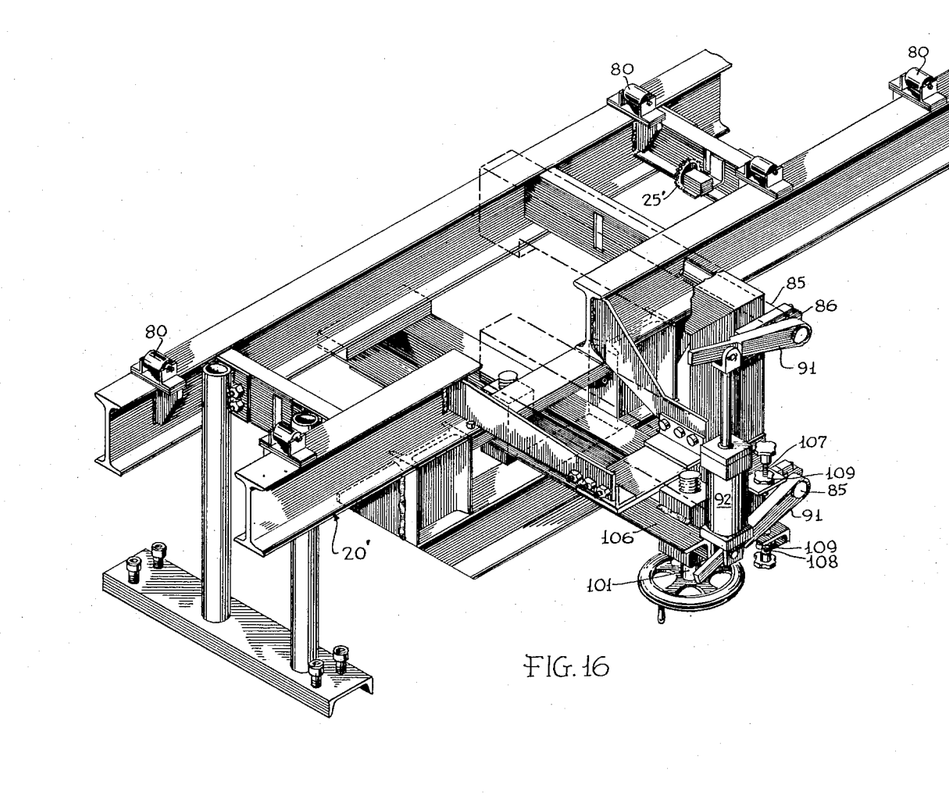
Fig. 16 is a perspective view from the weld support side of the machine, the table and rolls being removed.

The upper and lower limits of movement of the lower power arm 91, Figs. 11 and 16, are defined by stop screws 107 and 108 threaded in sleeves secured to the C-frame and locked by lock nuts 109.

The operation of the second form is very similar to that of the first. However, due to the changed swing axis mounting of the rolls, the pressure radii of the rolls are always in a common vertical plane once the initial adjustment of the upper roll at slide 95 has been made. But if the rolls are not adjusted properly in height relative to the common intermediate working plane the roll axes will not lie in a common vertical transverse plane and there will be a twisting action on the workpiece about a transverse axis. To overcome this the entire C-frame with both rolls is shifted vertically until the proper operating condition is provided.

Third embodiment

Figure 17:
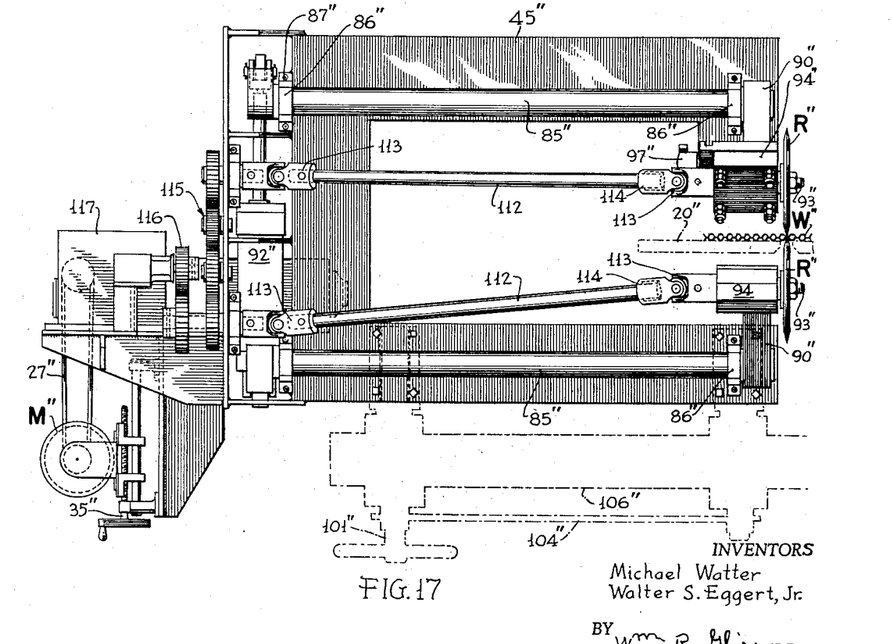
Fig. 17 is a transverse elevation, similar to Fig. 11, showing a modification of the second form in which the rolls are driven.
Figure 18:
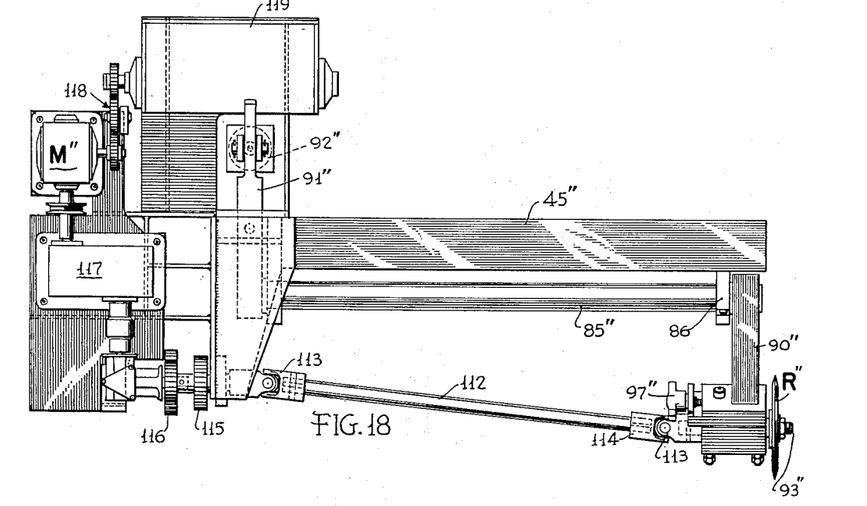
Fig. 18 is a top plan view of the apparatus shown in Fig. 17.
Figure 19:
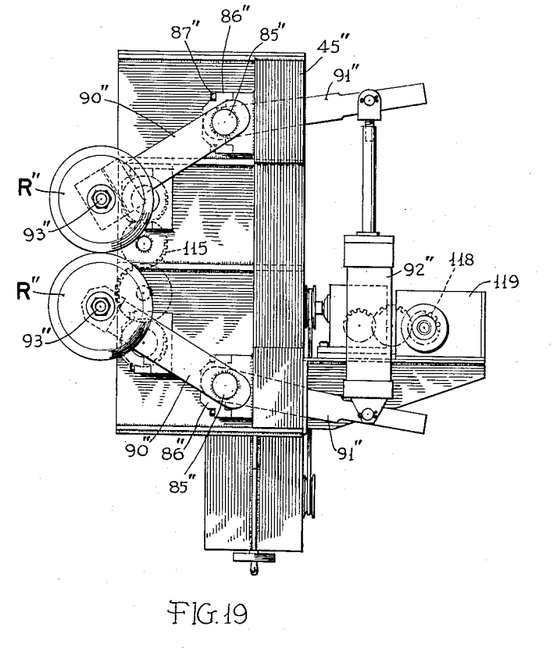
Fig. 19 is a side elevation taken from the roll side.

The third embodiment, shown in Figs 17 to 19, is very much like the second embodiment except that the welding rolls are power driven instead of free rolling, hence the table reciprocating mechanism of the first and second embodiments is not necessary. If the workpiece is very light it can be drawn along the surface of the table by the rolls. Or if the workpiece is clamped to the table and the table rolls easily, as on the rollers of the second embodiment, the rolls can easily move the table with the workpiece along as the welding proceeds. An advantage of the third form is that it is a self-contained unit and can be mounted alongside various tables or even used apart from a table for hand feed of the workpiece to weld along curved lines.

The C-frame 45″ is mounted for vertical adjustment by hand screws 101″, as before, and the rolls R″ are mounted on arms 90″ to swing about on transverse shafts 93″, as before; also the arms 91″ are operated by a common power motor 92″; but the rolls are positively driven by flexible drive shafts 112 having flexible couplings 113, 114, the latter having telescopic drive joints 114 to accommodate change in length in the shafts. The shafts 112 are driven in unison by a gear set 115 and one of the shafts, the lower, is driven through a gear set 116 and gears in a gear box 117 by a motor M″. Also driven in positive coordination from the gear box 117 through a gear set 118 is a multiple cam and switch weld timing mechanism housed in a cam switch box 119.

The motor is adjusted in position to tighten or slacken the drive belt 27″ by a hand screw 35″.

The operation of the third embodiment is so much like that of the second embodiment that no additional description is needed.

It is thus seen that the invention provides means for positively moving a workpiece along past welding rolls at a fixed support level and for adjusting the free-swinging paired rolls to meet squarely with reference to a common medial work plane for different levels and for different spacings between the rolls; also that means are provided for accurately spacing the welds and for quickly changing the spacing by the selection of the timing cam which is used. Also means are provided for shifting one of the rolls axially for lining it up with the other roll.

While certain embodiments of the invention have been described for purposes of illustration it is to be understood that there may be various embodiments and modifications within the general scope of the invention.

What is claimed is:

1. Resistance welding apparatus comprising in combination, a supporting table for guiding the movement of a workpiece in a horizontal plane, a pair of welding electrodes mounted alongside said table and movable from and toward each other for coacting with opposite sides of a workpiece moving on said table, means mounting said welding electrodes for swinging movement from and toward each other about axes distant from the weld line which they make on a workpiece, and means for adjusting the position of said electrodes relative to the top surface of the table to face each other squarely relative to a median working plane between them which is at different elevations relative to the top surface of the table.

2. Resistance welding apparatus comprising in combination, a base support, a table movable on said support for carrying a workpiece in a horizontal plane past welding electrodes, said table having a longitudinal slit for a lower electrode to engage beneath a workpiece mounted on the table, a pair of welding electrodes mounted alongside said table, means mounting the welding electrodes for swinging movement relative to each other and relative to a workpiece mounted on the table, and means for adjusting the elevation of both of said electrodes relative to the height of the table to cause them to meet fairly on a workpiece.

3. Resistance welding apparatus comprising in combination, a base support, a table movable on said support for carrying a workpiece past welding electrodes, said table having a longitudinal slit for a lower electrode to engage beneath a workpiece mounted on the table, a pair of welding electrodes mounted alongside said table, means mounting the welding electrodes for swinging movement relative to each other and relative to a workpiece mounted on the table, means for adjusting the elevation of both of said electrodes relative to the height of the table to cause them to meet fairly on a workpiece, and further means for adjusting one of said electrodes axially relative to the other to line up the working planes of the rolls with each other.

4. Resistance welding apparatus comprising in combination, a workpiece supporting table, a pair of electrodes mounted alongside said table, means swingably supporting said electrodes relative to each other and relative to the surface of said table about axes distant from the weld line, one electrode operating above and one below the top surface of the table, means for producing positive relative movement of a workpiece past said electrodes, cam timing means positively driven to match said movement for spacing welds made by said welding electrodes in a workpiece, and means for adjusting the height of said welding electrodes relative to said table.

5. Resistance welding apparatus comprising in combination, a table for supporting a workpiece at a fixed elevation at its upper surface, a pair of welding rolls, mounted alongside said table, pivoted lever arms mounting said rolls for swinging movement relative to each other and relative to the surface of said table, power means mounted to swing with said lever arms for moving the rolls relative to each other, and means for adjusting the elevation of both of said rolls to cause them to meet fairly relative to a common median working plane between them at different elevations relative to the top surface of the table.

6. Roller welding apparatus comprising in combination, a table for supporting a workpiece at a fixed elevation at its upper surface, a pair of welding rolls mounted alongside said table, pivoted lever arms mounting said rolls for swinging movement relative to each other and relative to the surface of said table, power means mounted to swing with said lever arms for moving the rolls relative to each other, and means for adjusting the elevation of both of said rolls to cause them to meet fairly relative to a common median working plane between them at different elevations relative to the top surface of the table, said adjusting means comprising separate adjusting means for each roll.

7. Roller welding apparatus comprising in combination, a table for supporting a workpiece at a fixed elevation at its upper surface, a pair of welding rolls mounted alongside said table, pivoted lever arms mounting said rolls for swinging movement relative to each other and relative to the surface of said table, power means mounted to swing with said lever arms for moving the rolls relative to each other, and means for adjusting the elevation of both of said rolls to cause them to meet fairly relative to a common median working plane between them at different elevations relative to the top surface of the table, said adjusting means comprising common adjusting means for both of said rolls together along with their mounting means and power means.

8. Roller welding apparatus comprising in combination, a work support table, a roll-carrying frame mounted for relative vertical adjustment with respect to the top surface of the table, welding rolls mounted alongside the table and operative above and below the table surface, pivoted levers mounted on said roll-carrying frame mounting said rolls for swinging movement relative to each other and relative to the surface of the table, and a common power means floating with said levers for swinging both of said rolls.

9. Apparatus as set forth in claim 8, which further includes means on one of said pivoted roll-carrying levers for adjusting the position of one of said rolls relative to the other.

10. Apparatus as set forth in claim 8, which further includes means for adjusting the axial position of one of said rolls relative to the other.

11. Roller welding apparatus comprising in combination, a work supporting table, pivoted levers located above and below said table, means mounting rotatable welding rolls on said levers above and below the table, said roll mounting means comprising vertically adjustable guide bars for moving each roll up or down on its supporting lever, and common power means floating with said levers for moving the rolls relative to each other.

12. Welding apparatus as set forth in claim 11 which further includes means for adjusting the position of one of said levers relative to its pivot.

References Cited in the file of this patent

UNITED STATES PATENTS

| | | |
|---|---|---|
| 1,234,365 | Makowski | July 24, 1917 |
| 1,315,239 | Pierce et al. | Sept. 9, 1919 |
| 1,315,939 | Agrew | Sept. 16, 1919 |
| 1,787,039 | Gibb | Dec. 30, 1930 |
| 1,787,115 | Lewis | Dec. 30, 1930 |
| 2,200,112 | Gilbert | May 7, 1940 |
| 2,389,034 | Eisler | Mar. 13, 1945 |
| 2,439,834 | Weightman | Apr. 20, 1948 |